United States Patent [19]

Heibein et al.

[11] 4,277,790

[45] Jul. 7, 1981

[54] FIELD REPLACEABLE MODULES FOR INK JET HEAD ASSEMBLY

[75] Inventors: Harry P. Heibein, Longmont, Colo.; Richard G. Millington, Charlotte, N.C.; John M. Salvadore, Boulder, Colo.; Dean J. Scott, Longmont, Colo.; Michael L. Sendelweck, Lafayette, Colo.

[73] Assignee: International Business Machines Corporation, Armonk, N.Y.

[21] Appl. No.: 107,225

[22] Filed: Dec. 26, 1979

[51] Int. Cl.$^3$ .................... G01D 15/18; G01D 15/00

[52] U.S. Cl. .................................... 346/75; 346/145; 346/140 R

[58] Field of Search .................... 346/75, 140 R, 145

[56] References Cited

U.S. PATENT DOCUMENTS

| | | | |
|---|---|---|---|
| 3,836,913 | 9/1974 | Burnett et al. | 346/75 |
| 4,074,284 | 2/1978 | Dexter et al. | 346/75 X |
| 4,080,608 | 3/1978 | Stoneburner et al. | 346/75 |
| 4,150,384 | 4/1979 | Meece | 346/75 |

OTHER PUBLICATIONS

Denny, C. M., Adjustable Ink Jet Head Assembly, IBM Tech. Disclosure Bull., Feb. 1973, vol. 15, No. 9, pp. 2787-2788.

Pelkie, R. E. et al., Cassette Ink Jet Head, IBM Tech. Disclosure Bull., Feb. 1975, vol. 17, No. 9, pp. 2622-2623.

Helinski, E. F., Mounting of an Ink Jet Nozzle for Adjustment During Startup and Shutdown, Nov. 1975, vol. 18, No. 6, pp. 1813-1814.

*Primary Examiner*—George H. Miller, Jr.

*Attorney, Agent, or Firm*—Homer L. Knearl

[57] ABSTRACT

The ink jet head assembly disclosed herein has modular subassemblies with predetermined relationships between the subassemblies to minimize realignment of the ink stream when a subassembly is replaced in the field. The head assembly is modularized into nozzle, charge electrode, deflection electrode and gutter subassemblies. The charge electrode module is mounted on the nozzle module in a manner such that no field adjustment is necessary to center the charge electrode horizontally to the ink stream. The deflection electrode module is mounted on the gutter module in a manner such that no field adjustment is necessary to center the deflection electrode horizontally to the ink stream. The nozzle and charge electrode subassembly have a preset adjustment, and the gutter and deflection electrode assembly have a preset adjustment such that no field adjustment between these two subassemblies is necessary to maintain a constant flight distance for the ink drops. Finally, the nozzle module is adjustable to reposition the ink stream about the pitch axis (vertical adjustment) and the yaw axis (horizontal adjustment). The yaw axis adjustment may be preset. The pitch axis adjustment is the only mechanical adjustment necessary in the field when replacing the nozzle module.

11 Claims, 3 Drawing Figures

FIELD REPLACEABLE MODULES FOR INK JET HEAD ASSEMBLY

DESCRIPTION

1. Field of the Invention

This invention relates to mechanically referencing the subassemblies in an ink jet print head in such a manner that they become preset field replaceable modules. More particularly, the invention relates to modularizing an ink jet head assembly and registering the modules with respect to each other so that one or more modules can be replaced, and minimal adjustment of the assembly is necessary to recalibrate the ink stream.

2. Background Art

The calibration of an ink stream in an ink jet print head requires multiple mechanical adjustments and electrical adjustments. Some electrical adjustments may be automated by providing sensors and servo-control loops. The manual adjustments are typically accomplished by an engineer using a microscope to observe the subassemblies or the ink stream as the adjustments are made.

Manual adjustments with the aid of a microscope are acceptable in a manufacturing environment; however, as a service procedure for a product installed in the field, they must be minimized. This problem of making precise adjustments to the print head in the field has been attacked in the past by replacing the entire ink jet head assembly. Examples of this approach are taught in U.S. Pat. No. 4,074,284 issued to Dexter et al on Feb. 14, 1978, and entitled "Ink Supply System and Print Head," and in the publication entitled "Cassette Ink Jet Head" by Pelkie et al published in the IBM Technical Disclosure Bulletin, Volume 17, Number 9, February, 1975, at pages 2622 and 2623.

Replacing an entire ink jet head assembly is not desirable because of the cost of the assembly. Furthermore, for high resolution printing (at least typewriter quality) manual electrical adjustments with the aid of a microscope are still necessary.

For the IBM 6640 Document Printer, manual service adjustments of an ink jet print head in the field with the aid of a small portable microscope have been accepted as a necessity to obtain high print quality. Servicing may include replacement of the nozzle subassembly, the charge electrode subassembly or the deflection plates subassembly. These subassemblies or modules do not have a preset registration relationship and therefore replacement of one or all of them requires use of the microscope to position the subassemblies relative to each other and to the ink stream. Furthermore, manual adjustments are also necessary while observing the flight of the ink drops with the microscope to achieve proper stream aiming.

SUMMARY OF THE INVENTION

It is the object of this invention to minimize the precise service adjustments of an ink jet print head while retaining the option of replacing modules in the ink jet head assembly.

In accordance with this invention, the above object has been accomplished by position registering the modules in the ink jet head assembly relative to the nozzle in the assembly and to an ink drop sensor in the assembly. The sensing point is located on the flight path of properly aimed undeflected ink drops. A reference line then exists through space from the nozzle to the sensing point. Each of the modules is preset with mechanical reference points to position register the module to that reference line. In addition, preset mechanical reference points position register the nozzle to the sensing point to define a reference drop flight distance along the reference line.

The great advantage of this position registered modular head is that modules may be replaced in the field and only one or two manual adjustments are necessary to recalibrate the print head. Furthermore, the sensor may be used to monitor one of these adjustments. Thus, high print quality has been achieved with a modular ink jet head while requiring only one or two service adjustments where the prior art required as many as ten adjustments.

DETAILED DESCRIPTION

Figure 1:
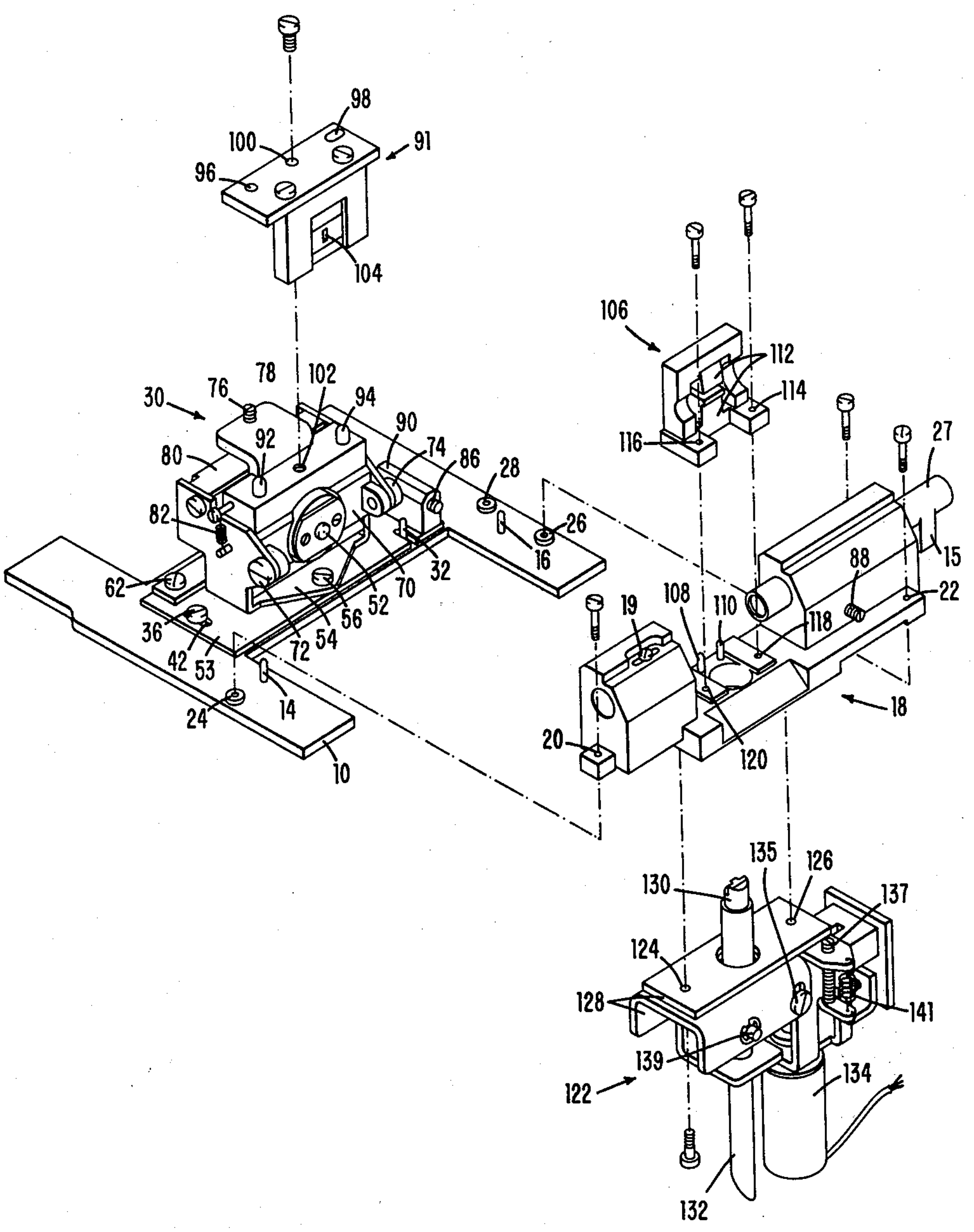
FIG. 1 shows an exploded view of the entire ink jet head assembly.
Figure 2:
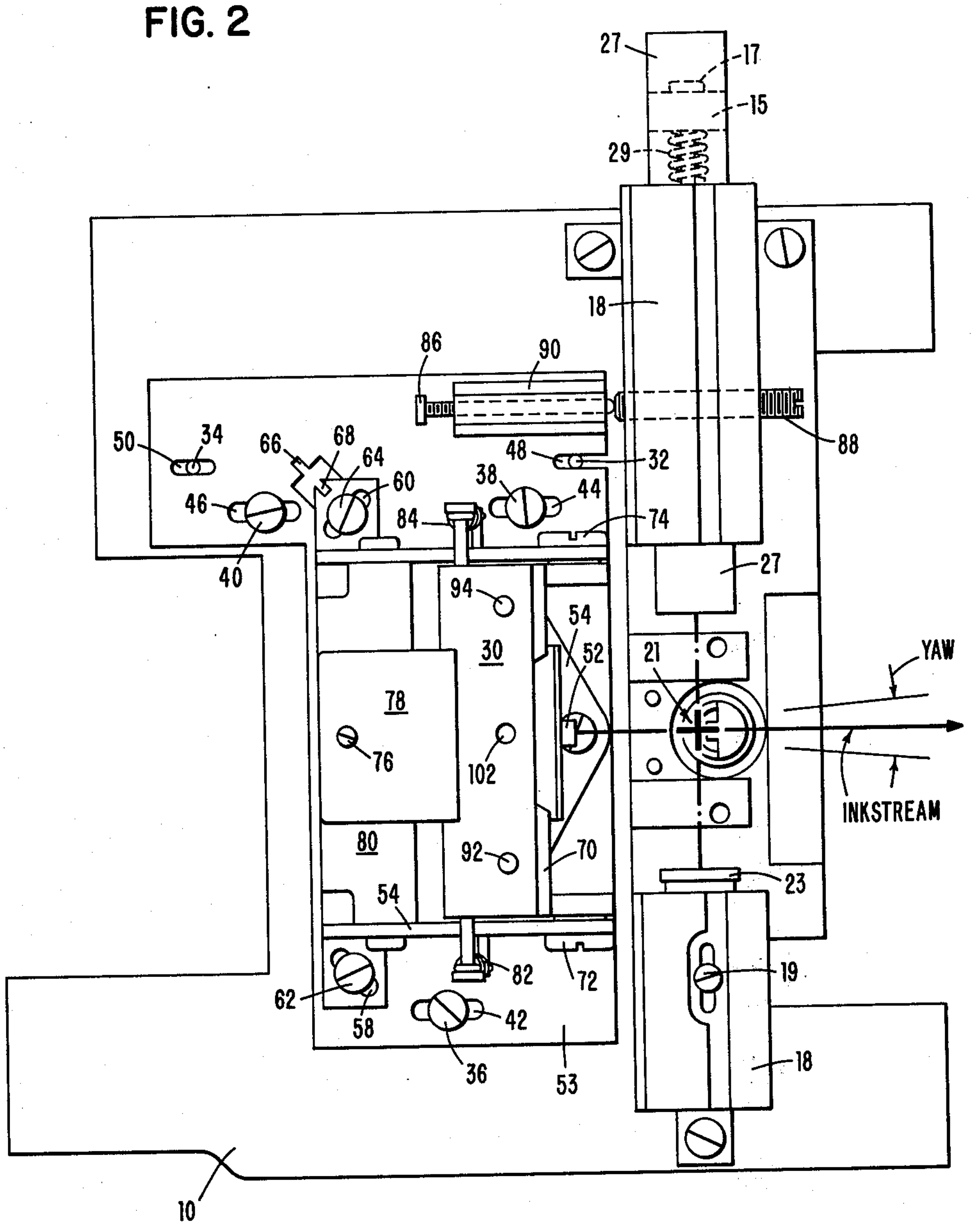
FIG. 2 shows a top view of the assembly with the charge electrode module and the deflection electrode module removed.
Figure 3:
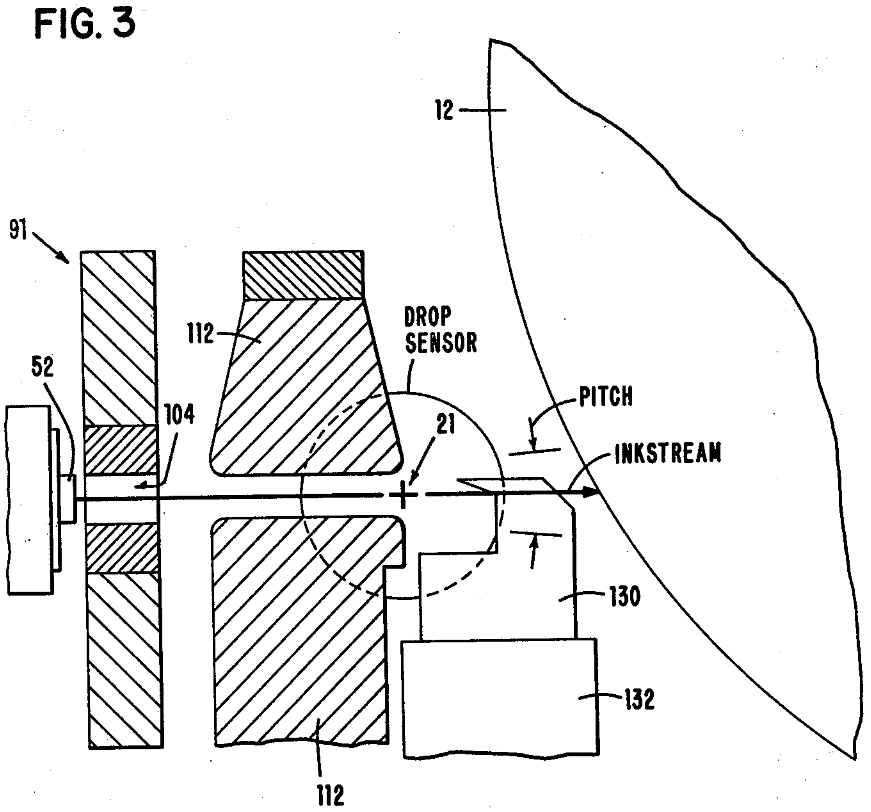
FIG. 3 is a schematic representation showing in a side view the relative positions of the nozzle, the ink drop flight control elements, the sensing point, the gutter and the print drum.

As the preferred embodiment is shown in FIGS. 1, 2 and 3 in different views, the same reference numerals will be used in each of the figures for the common parts. In FIGS. 1 and 2, the ink jet head assembly is mounted on an H frame member 10. Frame member 10 is mounted in the machine at a predetermined position relative to the print drum 12 (FIG. 3). The reference pins 14 and 16 fix the position of the sensor module 18 on the frame 10. Sensor module 18 contains reference holes in the bottom of the module that mate with pins 14 and 16. The sensor module is fastened on to the frame 10 by being placed over the reference pins 14 and 16 and bolted with screws through holes 20 and 22 and to threaded holes 24 and 26, respectively. A third threaded hole 28 is also provided on the frame and the matching bolt hole on the sensor module 18 is hidden from view in FIG. 1.

As shown in FIG. 2, the sensor module 18 carries an optical drop sensor focussed at a sensing point 21. Optical housing 23 contains a bulb 25 and a lens to focus the light from the bulb at the sensing point 21 (FIGS. 2 and 3). Optical housing 27 contains a photosensor and a lens to focus light from the sensing point to the photosensor. Optical housing 23 may be focussed on sensing point 21 by loosening screw 19, moving housing 23 and tightening screw 19 again. Optical housing 27 is focussed at sensing point 21 by adjusting screw 17 through boss 15 on housing 27. Screw 17 pushes against spring 29 to move housing 27.

The nozzle module 30 is also mounted on the H frame 10 by way of a frame 53. Referring to FIGS. 1 and 2, reference pins 32 and 34 provide a reference position for the nozzle module frame 53 on frame 10. Frame 53 is held on the frame 10 by screws 36, 38, and 40 through slotted holes 42, 44, and 46, respectively. The holes 48 and 50 for reference pins 32 and 34 are also slotted. Accordingly, the nozzle module may be moved relative to the frame 10 along the reference line to be established for the ink stream.

The nozzle module 30 includes the nozzle 52 and an internal ink cavity with a piezo-electric crystal for perturbing the ink stream to break the ink stream into droplets. A description of a nozzle and ink cavity that could be used in the preferred embodiment is described in the article entitled, "Grooved Nodal Ring Mount For Crystal," by M. R. McAllister published in the IBM Technical Disclosure Bulletin in October, 1976, (Volume 19, Number 5) at page 1752.

The nozzle module also includes frames 54 and 70 to permit adjustment for ink stream aiming. Frame 54 pivots about a verticle axis through the center of the face of nozzle 52. The pivot point is provided by screw 56 which passes through a hole in frame 54 centered on the vertical axis through the center of the nozzle 52. Frame 54 has slotted holes 58 and 60 (FIG. 2) through which screws 62 and 64, respectively, pass to fasten frame 54 to frame 53. Frame 53 contains a key slot 66 opposite a key slot 68 on frame 54. With the screws 56, 62, and 64 loosened slightly a screwdriver may be inserted in key slots 66 and 68 and twisted to aim the ink stream about the yaw or verticle axis through the center of the nozzle 52.

The nozzle module 30 is also adjustable about the pitch axis, the axis extending horizontally through the center of the face of nozzle 52. Frame 70, which carries the nozzle 52 and its ink cavity, is pivotally mounted on frame 54 about bolts 72 and 74. Bolts 72 and 74 are centered on the horizontal axis through the center of nozzle 52. The nozzle is pivoted about this horizontal or pitch axis by screw 76. Screw 76 is threaded through plate 78 and contacts plate 80 which is attached to frame 54. The nozzle module is biased by springs 82 and 84 to hold the point of screw 76 against plate 80. Thus by adjusting screw 76 the nozzle will pivot about the pitch axis.

The nozzle module is positioned relative to the sensor module a predetermined distance along the reference line for the ink stream. The distance between the nozzle and the sensor is controlled by screw 86 on the nozzle module and screw 88 on the sensor module. The screws are most clearly seen in FIG. 2. Screw 86 passes through a threaded mount 90 on frame 53 of the nozzle module. Screw 88 passes through a threaded hole on the sensor module 18.

To define a reference distance along the reference line from the nozzle 52 to the sensing point 21 of the sensor in the sensor module each of the screws 86 and 88 is preset to a distance relative to a reference point on their module. Screw 86 is preset relative to the face of nozzle 52. Screw 88 is preset relative to the sensing point 21 of the sensor. With screws 86 and 88 preset, the nozzle module may be inserted on frame 10 and slid forward until screw 86 abuts screw 88. The nozzle module is then tightened down by tightening screws 36, 38, and 40. In this manner, the nozzle module may be mounted relative to the sensor module with a preset distance between the nozzle 52 and the sensing point 21.

The charge electrode module 91 (FIG. 1) is mounted on the nozzle module 30. Reference pins 92 and 94 on the nozzle module provide a predetermined reference position for the charge electrode module on the nozzle module. Reference pin 92 passes through hole 96 in charge electrode module, while reference pin 94 passes through slotted hole 98 in the charge electrode module. With the electrode module 91 in position on the nozzle module, a screw passes through hole 100 and bolts the electrode module 91 to the nozzle module 30 at threaded hole 102.

The charge electrode channel 104 is preset relative to the reference hole 96 in the charge electrode module 91. The reference hole 98 is slotted so that channel 104 is referenced to the center of the hole 96. Reference slot 98 prevents the module 91 from rotating about the center of hole 96.

Reference pin 92 is precisely positioned relative to the reference line extending from the center of nozzle 52 to the sensing point 21. With the reference pin 92 referenced to the reference line and the reference hole 96 referenced to the charging channel 104, the charging channel 104 is centered about the refence line when the charge electrode module 91 is mounted on the nozzle module 30.

The deflection electrode module 106 (FIG. 1) is mounted on the sensor module 18. Reference pins 108 and 110 mate with reference holes (not visible) in the bottom of the deflection electrode module 106. The reference holes in module 106 have a preset positional relationship to the deflection electrodes 112 in the module 106. Reference pins 108 and 110 have a preset positional relationship to the reference line extending from the nozzle to the sensing point 21 of sensor module 18. Accordingly, the deflection electrode module 106 may be positioned on the sensor module 18 by the reference pins 108 and 110 and the reference holes in the deflection electrode module 106. Then the deflection electrodes 112 will be properly aligned with the reference line from the nozzle 52 to the sensing point 21. Once the deflection electrode module 106 is resting on the sensor module, screws are used to fasten module 106 via holes 114 and 116 and threaded holes 118 and 120 to the sensor module 18.

Gutter module 122 is attached to the bottom of sensor module 18 as shown in FIG. 1. Screws, not shown, pass through holes 124 and 126 in frame 128 of the gutter module to bolt the gutter module to the bottom of the sensor module 18. Gutter tip 130 then extends slightly above sensor point 21 as shown in FIG. 3. Ink caught by gutter tip 130 is returned to an ink recirculation system via gutter tube 132.

The position of the gutter tip 130 relative to the sensing point 21 can be preset in a standard sensor module before the gutter module is installed. Alternatively and preferably, the gutter module and sensor modules are preassembled to form a gutter and sensor subassembly. In either case the position of gutter tip 130 relative to sensing point 21 is preset to the position shown in FIG. 3.

The preset adjustment to position gutter tip 130 is made by loosening screw 135 (FIG. 1) and using screw 137 to raise or lower the solenoid 134 and a lever arm connecting the solenoid to the gutter tube 130. The lever arm is attached to gutter tube 130 and pivots about pin 139 to raise or lower the gutter tube. Thus by twisting screw 137 against spring 141, the rest position of solenoid 134 and therefore gutter tip 130 may be adjusted.

During calibration of the ink stream, gutter tip 130 is in the position shown in FIG. 3. During a printing operation solenoid 134 is energized to move the gutter tip 130 to a lower position slightly below the sensing point and the path of the "print" ink drops. No-print (gutter) drops are given a charge such that the deflection electrodes deflect the gutter drops into the gutter tip 130 at its lower position. The lower position of the gutter is preset by presetting the throw of the solenoid 134 and by presetting the up or rest position of the gutter as described above. Accordingly, the position of the gutter tip 130 below the sensing point 21 and thus the path of the print drops, is preset relative to the sensing point.

To replace one or more of the above modules, a module pre-registered to the reference line between the nozzle and the sensing point is simply substituted for the defective module. When the ink stream is again activated, it will probably be necessary to adjust the nozzle module about the pitch axis. This may simply be accomplished by rotating screw 76 to aim the nozzle 52 higher or lower. The presence of the ink stream at the sensing point 21 can be detected by a maximum amplitude signal in the pulses generated by the photosensor in the optical drop sensor. Accordingly, the operator need only use a screwdriver to rotate screw 76 until a maximum amplitude signal is sensed by the optical drop sensor. Of course, at this time, the gutter tip 130 is in the raised position to catch all drops from the nozzle 52.

A deviation in the spacing of the drops or the presence or absence of drops in the ink stream can be sensed by the optical drop sensor. Also, an electronic servo loop can be used to measure the flight time of the drops and in response to flight time deviations adjust the pump pressure to achieve the correct flight time between nozzle 52 and sensing point 21. When the drop flight time is correct, the velocity is correct. An example of such a servo loop is described in commonly-assigned U.S. Pat. No. 4,217,594, issued Aug. 12, 1980, filed Oct. 17, 1977 and entitled "Method and Apparatus for Determining the Velocity of a Liquid Stream of Droplets."

In addition, the operator may use a microscope to observe the deflection of the ink stream into the gutter when a "gutter" charge is placed onto the drops. The adjustment of the no-print voltage or gutter voltage for the charging of drops to be guttered is the only adjustment requiring a microscope.

While the invention has been described with particular hardware to register the modules to the reference line between the sensing point and the nozzle, it will be appreciated by one skilled in the art that any number of mechanical configurations might be selected to reference modules to the reference line. Furthermore, although we have illustrated and described the preferred embodiment of our invention, we do not limit ourselves to the precise constructions herein disclosed and the right is reserved to all changes and modifications coming within the scope of the invention as defined in the appended claims.

What is claimed is:

1. A modular ink jet head assembly having field replaceable modules, said assembly comprising:

a frame for holding the head assembly;

a nozzle module for projecting ink, said module having a nozzle, an ink cavity and a drop generating device;

a sensor mounted on said frame for sensing the ink stream, said sensor monitoring a sensing point in space through which a properly aimed ink drop should pass; and said nozzle module mounted on said frame with the nozzle a predetermined distance from the sensing point so that a reference line of predetermined length is defined along the desired flight path of the ink drops from the nozzle to the sensing point.

2. The apparatus of claim 1 and in addition:

flight control modules for controlling the flight of ink drops projected by the nozzle in said nozzle module; and said flight control modules mounted in a predetermined position relative to said reference line.

3. The apparatus of claim 2 wherein said flight control modules comprise:

a charge electrode module having a charging channel, said charge electrode module mounted so that the charging channel is aligned with said reference line; and a deflection electrode module having a deflection channel, said deflection electrode module mounted so that the deflection channel is aligned with said reference line.

4. The apparatus of claim 3 and in addition:

said nozzle module being preaimed about one axis which is perpendicular to the reference line and adjustable about the other axis perpendicular to the reference line, whereby only one mechanical adjustment of the head assembly is required during recalibration after replacement of one or more of the modules.

5. The apparatus of claim 1 wherein said sensor is mounted in a sensor module and said sensor module is mounted on the frame such that, when the nozzle module is mounted on the frame, the nozzle and sensing point are a predetermined distance apart on the reference line for a properly aimed ink drop projected from the nozzle.

6. The apparatus of claim 5 and in addition:

a charge electrode module having a charging channel for charging ink drops projected from the nozzle; and means for mounting said charge electrode module on the nozzle module at a predetermined position relative to the reference line so that the charging channel is aligned with and substantially centered on the reference line.

7. The apparatus of claim 6 and in addition:

a deflection electrode module having an electrode for deflecting charged ink drops with a deflection field; and means for mounting said deflection electrode module on the sensor module at a predetermined position relative to the reference line so that the deflection field is substantially centered on the reference line.

8. A prealigned modular ink jet head assembly comprising:

a nozzle;

a drop sensor for sensing drops at a predetermined sensing point;

a predetermined ink drop flight path defined by a line from the nozzle to the drop sensing point; and drop control modules for controlling the flight path of the drops, said modules mounted relative to the line whereby any module may be replaced without disrupting the mechanical registration of the modules to the flight of the ink drops.

9. The apparatus of claim 8 wherein said drop control modules comprise:

a drop charging module for charging ink drops from said nozzle, said charging module mounted relative to the reference line by registration pins at a fixed position relative to said reference line; and a drop deflecting module for deflecting charged ink drops, said deflecting module mounted relative to the reference line by registration pins at a fixed position relative to said reference line.

10. The apparatus of claim 8 wherein:

said nozzle is mounted on a nozzle module having a registration element at a predetermined position relative to said nozzle;

said drop sensor is mounted on a sensor module having a registration element at a predetermined position relative to said drop sensing point; and mounting means for mounting said nozzle module with its registration element at a predetermined position relative to the registration element of said sensor module whereby a reference line of a predetermined length and direction is defined by the position of the nozzle relative to the drop sensing point.

11. The apparatus of claim 10 wherein said drop control modules comprise:

a drop charging module for charging ink drops from said nozzle, said charging module mounted relative to the reference line by registration pins on said nozzle module at a fixed position relative to said reference line; and a drop deflecting module for deflecting charged ink drops, said deflecting module mounted relative to the reference line by registration pins on said sensor module at a fixed position relative to said reference line.

* * * * *